Nov. 25, 1958 P. R. R. AIGRAIN 2,862,186

TRANSMISSION OF A DERIVATIVE SIGNAL BY PULSE CODE

Filed Aug. 5, 1953 2 Sheets-Sheet 1

INVENTOR

PIERRE RAOUL ROGER AIGRAIN

BY R P Morris

ATTORNEY

Nov. 25, 1958 P. R. R. AIGRAIN 2,862,186

TRANSMISSION OF A DERIVATIVE SIGNAL BY PULSE CODE

Filed Aug. 5, 1953 2 Sheets-Sheet 2

INVENTOR

PIERRE RAOUL ROGER AIGRAIN

BY R P Morris

ATTORNEY

United States Patent Office 2,862,186

Patented Nov. 25, 1958

2,862,186

TRANSMISSION OF A DERIVATIVE SIGNAL BY PULSE CODE

Pierre Raoul Roger Aigrain, Paris, France, assignor to International Standard Electric Corporation, New York, N. Y., a corporation of Delaware Application August 5, 1953, Serial No. 372,424

Claims priority, application France August 7, 1952

3 Claims. (Cl. 332—11)

The present invention relates to coded transmission systems and in particular to transmission systems permitting to transmit information by means of constant amplitude impulses.

Numerous transmission systems are known for coding impulses. In one of these systems the information is transmitted by means of the absence or of the presence of impulses separated by predetermined time intervals.

One of the objects of the present invention is to provide a simple coding circuit for a transmission system of this type.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
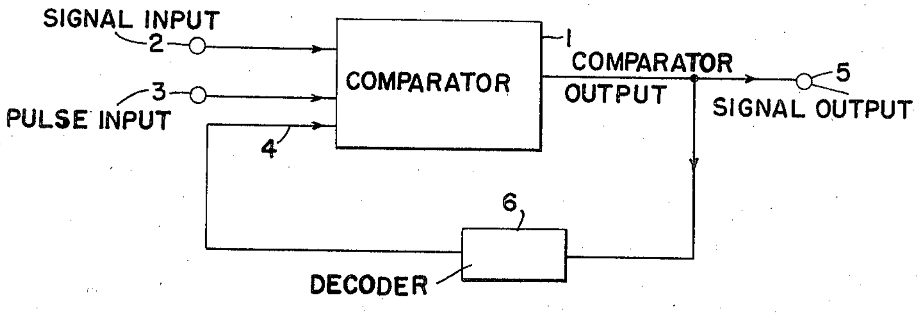
FIG. 1 (PRIOR ART)
Fig. 1 is a block diagram of a known coding circuit.
Figure 2:
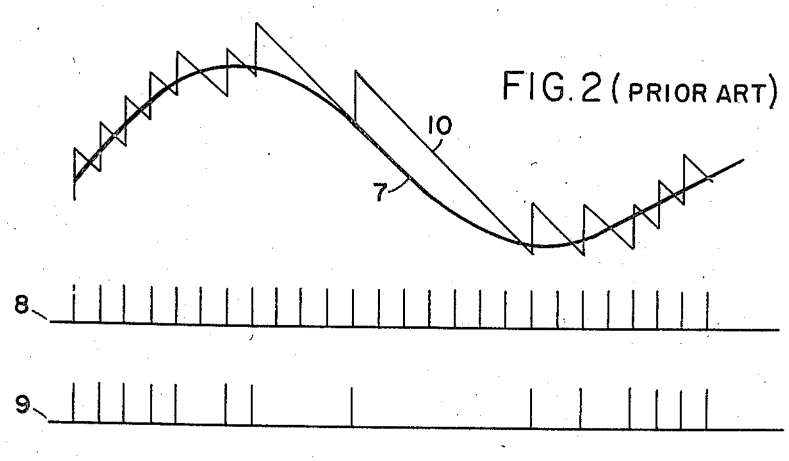
FIG. 2 (PRIOR ART)
Fig. 2 is a graph used in the explanation of Fig. 1.

A well known modulation system has been schematically represented in Fig. 1 and, in Fig. 2, the wave shapes in different points of the circuit.

The system shown in the Fig. 1 comprises a comparator circuit 1 comprising three lead-in 2, 3, and 4, and an output lead 5. The output signals of the comparator circuit 1 are applied to a decoding circuit 6 identical to the one which will be used at the receiver; the output signals from the circuit 6 are applied to the lead-in conductor 4 of the comparator circuit 1. There is applied to the input 2 the signal to be coded which is represented in 7 (Fig. 2) and there is applied at the input 3 of the comparator circuit 1, reference impulses regularly spaced which have been shown in 8 (Fig. 2). The comparator circuit is arranged to pass reference pulses to the output when, at the time a reference impulse is applied, the amplitude of the signal applied to terminal 2 is greater than the amplitude of the signal applied to the input terminal 4 by decoding circuit 6. In the contrary case, the comparator circuit is arranged so as to prevent the passage of the reference impulses towards the output terminal 5. The output impulses from the comparator circuit have been shown in 9 (Fig. 2). The decoding circuit 6 is constituted for example by an integrating circuit comprising for example a condenser and a constant discharge current circuit, the charging circuit of the condenser being provided so that every output impulse from circuit 1 increases the charge of the condenser 2Q whereas between 2 impulses the condenser discharges by a quantity Q. There has been shown in 10 (Fig. 2) the output signal from circuit 6. It is easy to see that the signal applied in 2 may be reconstituted from the output impulses from circuit 1 by utilising in the receiver a decoding circuit similar to circuit 6 or filling the same functions.

Figure 3:
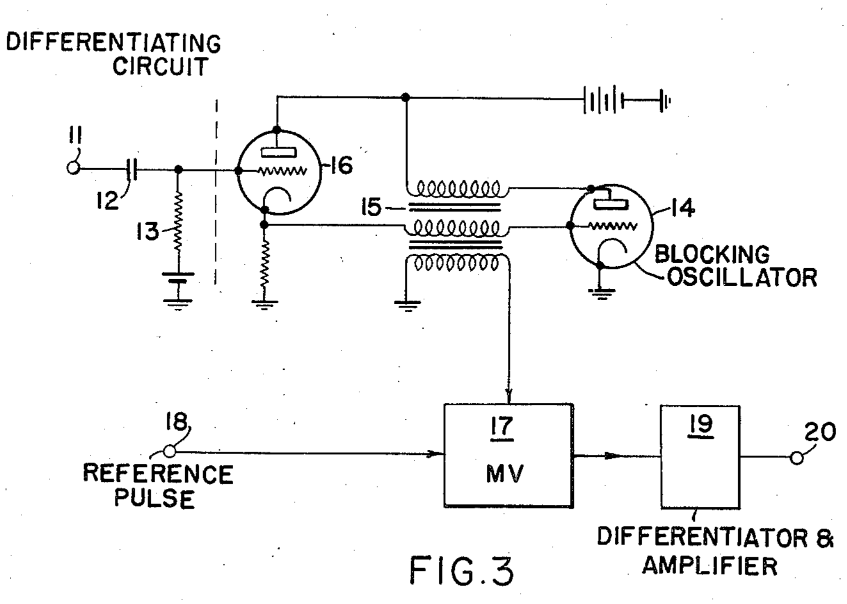
Fig. 3 is a block diagram of an impulse coding circuit incorporating features of the present invention.

The Fig. 3 represents a circuit embodying features of the present invention which likewise enables one to obtain from an input signal identical to that shown in 7 (Fig. 2), output impulses identical to those shown in 9 (Fig. 2). The signal which is to be coded is applied from terminal 11 to a differentiating circuit comprising a condenser 12 and a resistance 13. The differentiated signals are applied to the grid of an impulse generator modulated in frequency and designed in such a way that the distance separating two consecutive impulses be given by the formula:

$$\sum_{t_1}^{t_2}[1+f(t)]dt=t_2-t_1+\sum_{t_1}^{t_2}f(t)dt=a$$

in which $f(t)$ is the impulse signal, $t_1$ and $t_2$ the instants of time at which take place the two consecutive impulses and $a$ a constant. Such an oscillator may be realized by means for example of a blocking oscillator constituted by a triode 14 and a three windings transformer 15; the triode 16 is used for modulating according to a known process the recurrent frequency of the output impulses from the blocking oscillator. Essentially in this process the triode 16 modifies the recurrence frequency of the blocking oscillator by varying the bias on the grid of triode 14. The output impulses from the oscillator are picked up by means of the lower winding of the transformer 15 and are applied to a flip-flop circuit 17 having two stable equilibrium positions which will be designated by A and B. The impulse obtained from the oscillator 14—15 is applied to a flip-flop circuit in order to cause it to pass into position B if it is in position A and to have no influence if it is in position B. Reference impulses identical to the impulses shown in 8 (Fig. 2) are also applied by terminal 18 to the flip-flop circuit 17 in such a way that they have an inverse action from that of the impulses obtained from the oscillator 13—14. In other words if the flip-flop circuit is in position B, when there is applied thereto a reference impulse it passes to position A and if it is already in position A, the reference impulse has no effect. The output impulses from the flip-flop circuit are differentiated and amplified by the circuit 19 which let pass the impulses corresponding only to the change from position B to position A and which constitute the coded impulses which are obtained from terminal 20. In order to understand the operation of this system one should notice that the function of the flip-flop circuit is in essence to allow the passage of a reference impulse when, after a preceeding reference impulse, an output impulse from generator 14—15 has been applied to flip-flop circuit. More precisely of course, the reference pulse at such time trips the flip-flop circuit which then produces an output pulse. If $g(t)$ represents the signal applied to the coding circuit there is obtained from the Equation 1.

$$t_2-t_1+g(t_2)-g(t_1)=a$$

Figure 4:
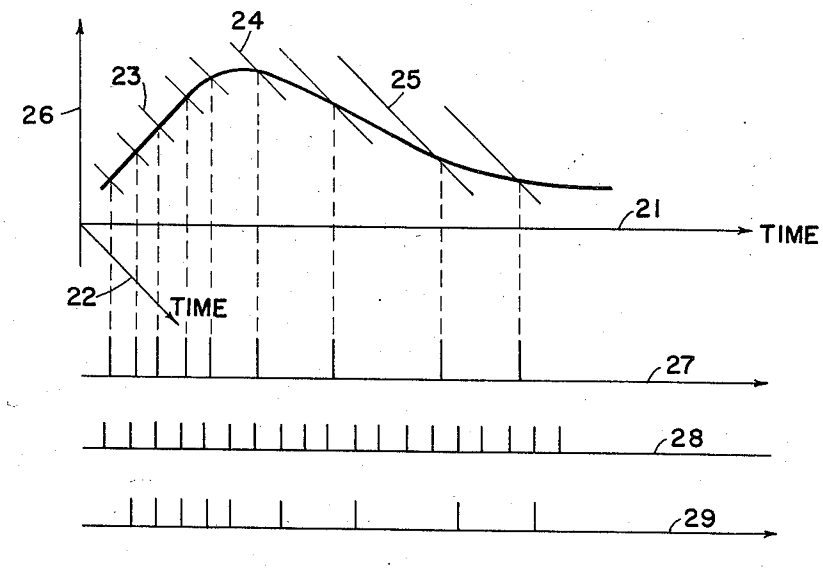
Fig. 4 represents wave shapes at different points of the circuit of the Fig. 3.

There has been shown in Fig. 4, the quantity $t+g(t)$ in function of $t$ in an oblique skewed system of coordinates thus representing the function $g(t)$ in an ordinary Cartesian system. There is shown in 21 in this figure the axis of time for $g(t)$, in 22 the axis of time $t+g(t)$, the lines such as 23, 24, 25 are lines corresponding to the equation.

$$t+g(t)=na \quad (n \text{ being a whole number})$$

the axis 26 corresponding to the value of the function $g(t)$ and $(t+g(t))$. There has been shown in 27 the impulses modulated in frequency obtained at the output of the oscillator 14—15, in 28 the reference impulses, in 29 the output impulses obtained in 20 (Fig. 3). It is easy to see how one obtains the coded impulses which from the point of view of the information they contain with respect to the input signal, are equivalent to the impulses obtained by means of the circuit shown in Fig. 1.

Figure 5:
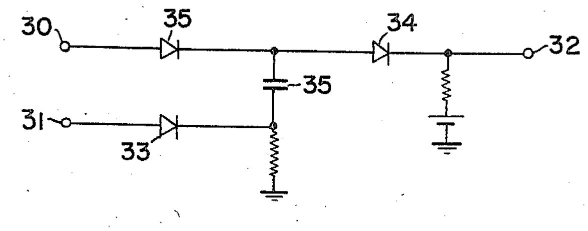
Fig. 5 is a schematic diagram of a modification of a circuit element used in Fig. 3.

There has been shown in Fig. 5 a circuit which may be used in place of the circuit 17 (Fig. 3). The impulses modulated in frequency obtained at the output of oscillator 14—15 are applied to terminal 30, the reference impulses are applied at terminal 31 and output impulses are obtained from terminal 32. The reference impulses which are applied through the rectifier 33 are of insufficient amplitude of themselves to unblock the rectifier 34 through the condenser 35 until the latter has been previously charged through the rectifier 33 by an output impulse from generator 14—15 (Fig. 3). It is easy to see that there is obtained from terminal 32, signals of identical form to those obtained from output terminal 20 (Fig. 3).

While the principles of the invention have been described above in connection with specific embodiments and particular modifications thereof, it is to be clearly understood that this description is made only by way of example and not as a limitation on the scope of the invention.

I claim:

1. A coded pulse transmission system of the type referred to comprising a signal source, means for differentiating signals of said source, means for producing pulses in response to said differentiated signals which are time modulated in accordance therewith, a source of reference pulses of predetermined constant repetition rate and means jointly responsive to said time modulated pulses and to said reference pulses for producing coded output pulses in which the signal wave intelligence is conveyed by the presence or absence of pulses in regularly repetitive time periods.

2. A system according to claim 1 wherein said last-mentioned means comprises a two stable level trigger device, connections for applying the time modulated pulses to trip said bistable device from a first stable level to a second and connections for applying said reference pulses to trip said bistable device from said second level back to said first level, and connections for producing an output pulse whenever said bistable device is tripped to its first stable level.

3. A system according to claim 1 wherein said last-mentioned means comprises a condenser charged by a time modulated pulse, means for applying the reference pulses in series with said condenser and a normally blocked circuit adapted to pass current in response to the combined voltage of the charged condenser and the reference pulse.

References Cited in the file of this patent

UNITED STATES PATENTS

| | | |
|---|---|---|
| 2,589,465 | Weiner | Mar. 18, 1952 |
| 2,609,529 | Lesti | Sept. 2, 1952 |
| 2,619,632 | Krumhansel et al. | Nov. 25, 1952 |
| 2,662,118 | Schouten et al. | Dec. 8, 1953 |
| 2,676,202 | Filipowsky | Apr. 20, 1954 |